United States Patent
Kanada et al.

(10) Patent No.: US 10,109,403 B2
(45) Date of Patent: Oct. 23, 2018

(54) R-T-B BASED SINTERED MAGNET AND MOTOR

(71) Applicant: TDK CORPORATION, Tokyo (JP)

(72) Inventors: Isao Kanada, Tokyo (JP); Hiroyuki Ono, Tokyo (JP); Eiji Kato, Tokyo (JP); Masashi Miwa, Tokyo (JP)

(73) Assignee: TDK CORPORATION, Tokyo (JP)

(*) Notice: Subject to any disclaimer, the term of this patent is extended or adjusted under 35 U.S.C. 154(b) by 12 days.

(21) Appl. No.: 14/909,563

(22) PCT Filed: Aug. 8, 2014

(86) PCT No.: PCT/JP2014/070971
§ 371 (c)(1),
(2) Date: Feb. 2, 2016

(87) PCT Pub. No.: WO2015/020183
PCT Pub. Date: Feb. 12, 2015

(65) Prior Publication Data
US 2016/0180993 A1    Jun. 23, 2016

(30) Foreign Application Priority Data

Aug. 9, 2013   (JP) ................................ 2013-166358

(51) Int. Cl.
*H01F 1/057* (2006.01)
*H01F 1/055* (2006.01)
(Continued)

(52) U.S. Cl.
CPC ........... *H01F 1/0577* (2013.01); *C22C 38/00* (2013.01); *C22C 38/002* (2013.01);
(Continued)

(58) Field of Classification Search
None
See application file for complete search history.

(56) References Cited

U.S. PATENT DOCUMENTS

2013/0026870 A1    1/2013  Baba et al.
2013/0092868 A1*   4/2013  Nakajima ............. C22C 38/005
                                               252/62.51 R
(Continued)

FOREIGN PATENT DOCUMENTS

CN       103098151 A     5/2013
JP       2002-327255 A  11/2002
(Continued)

OTHER PUBLICATIONS

Katter et al. (IEEE Transactions on Magnetics, 2001, vol. 37, p. 2474-2476).*

(Continued)

*Primary Examiner* — Xiaowei Su
(74) *Attorney, Agent, or Firm* — Oliff PLC

(57) ABSTRACT

The present invention provides an R-T-B based sintered magnet that inhibits the demagnetization rate at high temperature even when less or no heavy rare earth elements such as Dy, Tb and the like are used. The R-T-B based sintered magnet comprises $R_2T_{14}B$ crystal grains and two-grain boundary parts between the $R_2T_{14}B$ crystal grains. Two-grain boundary parts formed by a phase containing R, Cu, Co, Ga and Fe with a ratio of $40 \leq R \leq 70$, $1 \leq Co \leq 10$, $5 \leq Cu \leq 50$, $1 \leq Ga \leq 15$, and $1 \leq Fe \leq 40$ (wherein, $R+Cu+Co+Ga+Fe=100$, and R is at least one selected from rare earth elements) exists in the magnet.

4 Claims, 3 Drawing Sheets

(51) Int. Cl.
*C22C 38/00* (2006.01)
*C22C 38/06* (2006.01)
*C22C 38/10* (2006.01)
*C22C 38/16* (2006.01)
*H02K 1/02* (2006.01)
*H01F 41/02* (2006.01)

(52) U.S. Cl.
CPC ............ *C22C 38/005* (2013.01); *C22C 38/06* (2013.01); *C22C 38/10* (2013.01); *C22C 38/16* (2013.01); *H01F 1/0551* (2013.01); *H02K 1/02* (2013.01); *B22F 2998/10* (2013.01); *B22F 2999/00* (2013.01); *C22C 2202/02* (2013.01); *H01F 41/0293* (2013.01)

(56) References Cited

U.S. PATENT DOCUMENTS

| | | |
|---|---|---|
| 2013/0099150 A1 | 4/2013 | Nakajima et al. |
| 2014/0242267 A1 | 8/2014 | Shoji et al. |
| 2016/0042847 A1 | 2/2016 | Nishiuchi et al. |
| 2016/0042848 A1* | 2/2016 | Kuniyoshi ............ C22C 38/002 75/246 |

FOREIGN PATENT DOCUMENTS

| | | |
|---|---|---|
| JP | 2006-295140 A | 10/2006 |
| JP | 2009-231391 A | 10/2009 |
| JP | 2012-015168 A | 1/2012 |
| JP | 2012-015169 A | 1/2012 |
| WO | 2013/073486 A1 | 5/2013 |
| WO | 2014/157448 A1 | 10/2014 |

OTHER PUBLICATIONS

Tokunaga (Proc. of the MRS International Meeting on Advanced Materials, vol. 11, Mater. Res. Soc.: Pittsburgh, 1989, p. 53-67).*

Kim (IEEE Transactions on Magnetics, 1995, vol. 31, p. 3620-3622).*

Nov. 25, 2014 Search Report issued in International Patent Application No. PCT/JP2014/070971.

Nov. 25, 2014 Written Opinion issued in International Patent Application No. PCT/JP2014/070971.

Feb. 9, 2016 International Preliminary Report on Patentability issued in International Patent Application No. PCT/JP2014/070971.

* cited by examiner

R-T-B BASED SINTERED MAGNET AND MOTOR

The present invention relates to an R-T-B based sintered magnet, more specifically, it relates to an R-T-B based sintered magnet in which the microstructure of the R-T-B based sintered magnet is controlled, and a motor including the same.

BACKGROUND

The R-T-B based sintered magnet (R represents a rare earth element, T represents one or more elements of iron group elements containing Fe as an essential, and B represents boron), a representative of which is Nd—Fe—B based sintered magnet, is advantageous for miniaturization and high efficiency of the machines using it due to high saturation flux density, and thus can be used in the voice coil motor of the hard disk drive and the like. In recent years, the R-T-B based sintered magnet also has been applicable in various industrial motors, or driving motors of hybrid vehicles, or the like. From the viewpoint of energy conservation and the like, it is desirable that the R-T-B based sintered magnet can be further popularized in these fields. However, when applied in the hybrid vehicles and the like, the R-T-B based sintered magnet will be exposed to a relatively high temperature. Therefore, inhibition of the high temperature demagnetization caused by heat becomes important. For inhibition of the demagnetization under high temperature, a method for sufficiently improving coercivity (Hcj) of the R-T-B based sintered magnet at room temperature is well known as effective.

For example, as a method for improving a coercivity of the Nd—Fe—B based sintered magnet at room temperature, a method in which part of Nd of the compound $Nd_2Fe_{14}B$ as the main phase is replaced with heavy rare earth elements such as Dy, Tb and the like is well known. By replacing part of Nd with the heavy rare earth elements, the magnetic anisotropy of crystals is increased, and as a result, the coercivity of the Nd—Fe—B based sintered magnet at room temperature can be sufficiently improved. In addition to the replacement with heavy rare earth elements, addition of elements such as Cu and the like is also effective in improving coercivity at room temperature (Patent Document 1). It is considered that by adding the Cu element, the Cu element forms, e.g., an Nd—Cu liquid phase, at the grain boundary during the production process, and thus the grain boundary becomes smooth, inhibiting nucleation of reverse magnetic domains.

On the other hand, Patent Document 2 and Patent Document 3 have disclosed the technology for enhancing the coercivity by controlling the grain boundary phases which are the microstructure of the R-T-B based sintered magnet. It may be derived from the drawings in these patent documents that, the grain boundary phases as mentioned herein refer to grain boundary phases surrounded by three or more main phase crystal grains, i.e., triple junctions. Patent Document 2 has disclosed a technology for constructing two kinds of grain boundary phases with different Dy concentrations. That is, it has disclosed that by forming a part of grain boundary phases with higher Dy concentration in the triple junctions without increasing the entire Dy concentrations, a high resistance to the reversal of the magnetic domain can be provided. Patent Document 3 has disclosed such a technology in which, three, i.e., first, second and third grain boundary phases which are different in total atomic concentrations of rare earth element is formed in the grain boundary triple junction, the atomic concentration of rare earth element of the third grain boundary phase is lower than that of the other two kinds of grain boundary phases, and in addition, the atomic concentration of the Fe element in the third grain boundary phase is higher than that in the other two grain boundary phases. As a result, the third grain boundary phase containing a high concentration of Fe is formed in the grain boundary phases, which can induce the effect of increasing the coercivity.

PATENT DOCUMENTS

Patent Document 1: Japanese Patent JP-A No. 2002-327255
Patent Document 2: Japanese Patent JP-A No. 2012-15168
Patent Document 3: Japanese Patent JP-A No. 2012-15169

SUMMARY

Although in a situation of using R-T-B based sintered magnet at an environment with a high temperature of 100° C. to 200° C., the value of the coercivity at room temperature is one of the effective indexes, it is very important that demagnetization does not occur or the demagnetization rate is low even when the magnet is actually exposed to an environment with a high temperature. Although the coercivity of the composition where part of R of the compound $R_2T_{14}B$ which acts as the main phase is replaced by the heavy rare earth element such as Tb or Dy is improved remarkably and this is a simple method to get a high coercivity, there are problems in the resources since the heavy rare earth elements such as Dy and Tb are limited in geographical origins and yields. Accompanying with the replacement, it is unavoidable for the residual magnetic flux density (Br) to decrease due to antiferromagnetic coupling of Nd and Dy. Addition of the Cu element as described above and the like are effective to get an improved coercivity. Nonetheless, in order to enlarge the applicable field of the R-T-B based sintered magnet, it is desirable that the suppression on demagnetization at high temperature (demagnetization due to exposure to a high temperature environment) is further enhanced.

In order to increase the coercivity of the R-T-B based sintered magnets, it is well known that in addition to the above method of adding Cu element, it is important to control the grain boundary phases which act as the microstructure. The grain boundaries include a so-called two-grain boundary part formed between adjacent two main phase crystal grains, and a so-called triple junction surrounded by three or more main phase crystal grains as mentioned above.

For increasing the coercivity of R-T-B based sintered magnets, it is important to cut off the magnetic coupling between $R_2T_{14}B$ crystal grains which act as the main phase. If each main-phase crystal grain can be isolated magnetically, the reverse magnetic domain, even generated in a certain crystal grain, will not affect the adjacent crystal grains, and thus the coercivity can be increased. The inventors of the present application believe that in order to impart the magnetic cutting-off effect between adjacent crystal grains to R-T-B based sintered magnets, controlling the two-grain boundary parts is more important than controlling the triple junctions and the inventors studied the various R-T-B based sintered magnets in the prior art. As a result, a technical problem is recognized, i.e., the extent of the cutting off magnetic coupling in the two-grain boundary part of the current R-T-B based sintered magnets is not sufficient yet. That is, the current two-grain boundary parts formed between two $R_2T_{14}B$ main-phase crystal grains are as thin as 2 to 3 nm, which will not generate a sufficient cutting-off effect on magnetic coupling. It is considered that a sufficient cutting-off effect on magnetic coupling can be obtained by just extremely thickening the two-grain boundary part. And, it is believed that in order to thickening the two-grain boundary part, the ratio of R in the composition of the raw material alloys needs to be increased. However, though the coercivity will be enhanced with the increase of the ratio of R, if the ratio of R is extremely increased, the growth of the main phase crystal grains during sintering becomes excessive, and thus the coercivity decreases. Therefore, the effect on increasing the coercivity by increasing the content of R is restrictive.

The present invention is completed in view of the above circumstances. The present invention aims to provide an R-T-B based magnet for which the suppression on high-temperature demagnetization rate is improved by controlling the two-grain boundary parts, which acts as the microstructure of the R-T-B based sintered magnet.

Here, the inventors of the present application conducted a special research regarding the two-grain boundary parts that can extraordinarily improve the suppression on high-temperature demagnetization rate, and consequently, completed the following invention.

The R-T-B based sintered magnet according to the present invention is characterized in that the R-T-B based sintered magnet comprises $R_2T_{14}B$ crystal grains and two-grain boundary parts between the $R_2T_{14}B$ crystal grains, and the two-grain boundary parts formed by a phase containing R, Cu, Co, Ga, and Fe with the ratio of 40≤R≤70, 1≤Co≤10, 5≤Cu≤50, 1≤Ga≤15, and 1≤Fe≤40 (wherein, R+Cu+Co+Ga+Fe=100, and R is at least one selected from rare earth elements) exist.

Further, the thickness of the two-grain boundary parts formed by the above phase is preferable 5~500 nm.

The R-T-B based sintered magnet according to the present invention has the characteristics that the effect of cutting off the magnetic coupling between the $R_2T_{14}B$ crystal grains is dramatically improved by making the width of the two-grain boundary parts formed between the $R_2T_{14}B$ crystal grains wider than that conventionally observed and forming the two-grain boundary parts with nonmagnetic materials or materials having exceedingly weakly magnetic properties. The two-grain boundary parts are the parts formed by the grain boundary phase between the adjacent two $R_2T_{14}B$ crystal grains. As mentioned above, there is a limit to thicken the two-grain boundary part by increasing the ratio of R in the composition of the raw material alloys without the decrease of the coercivity. On the contrary, the present inventors have earnestly studied and found that the two-grain boundary parts formed by the R—Co—Cu—Ga—Fe phase have a larger thickness than that of the conventional two-grain boundary phase. Further, the present inventors have found that the magnetic coupling can be effectively cut off by making the thickness of the two-grain boundary parts formed by the R—Co-Fu-Ga—Fe phase be 5~500 nm. Further, Fe and Co are contained in the R—Co—Cu—Ga—Fe phases, but it can be considered that the total content of Fe and Co is 40 atomic % or less, and thus magnetization is rather small. Hence, the magnetic coupling between the $R_2T_{14}B$ crystal grains can be effectively cut off, and thus the coercivity can be improved and demagnetization at the high temperature can be inhibited.

The present invention further provides a motor including the above R-T-B based sintered magnet of the present invention. Since the motor of the present invention has the R-T-B based sintered magnet of the present invention, the demagnetization of the R-T-B based sintered magnet at the high temperature will not occur even if it is used at a harsh condition such as a high temperature. Thus, a reliable motor whose output is hardly reduced can be obtained.

According to the present invention, the R-T-B based sintered magnet with a small demagnetization at the high temperature can be provided, and an R-T-B based sintered magnet applicant to the motors and the like for use in a high temperature environment can be provided. Additionally, according to the present invention, a reliable motor whose output is hardly reduced can be provided by including such an R-T-B based sintered magnet.

DETAILED DESCRIPTION OF EMBODIMENTS

Hereinafter, the preferred embodiments of the present invention are illustrated while making a reference to the drawings. In addition, the R-T-B based sintered magnet as mentioned in this invention refers to a sintered magnet containing $R_2T_{14}B$ main phase crystal grains and two-grain boundary parts, and in the sintered magnet, R contains one or more rare earth elements, T contains one or more iron group elements with Fe as an essential element, B is contained, furthermore a sintered magnet added with various well-known additive elements are included.

Figure 1:
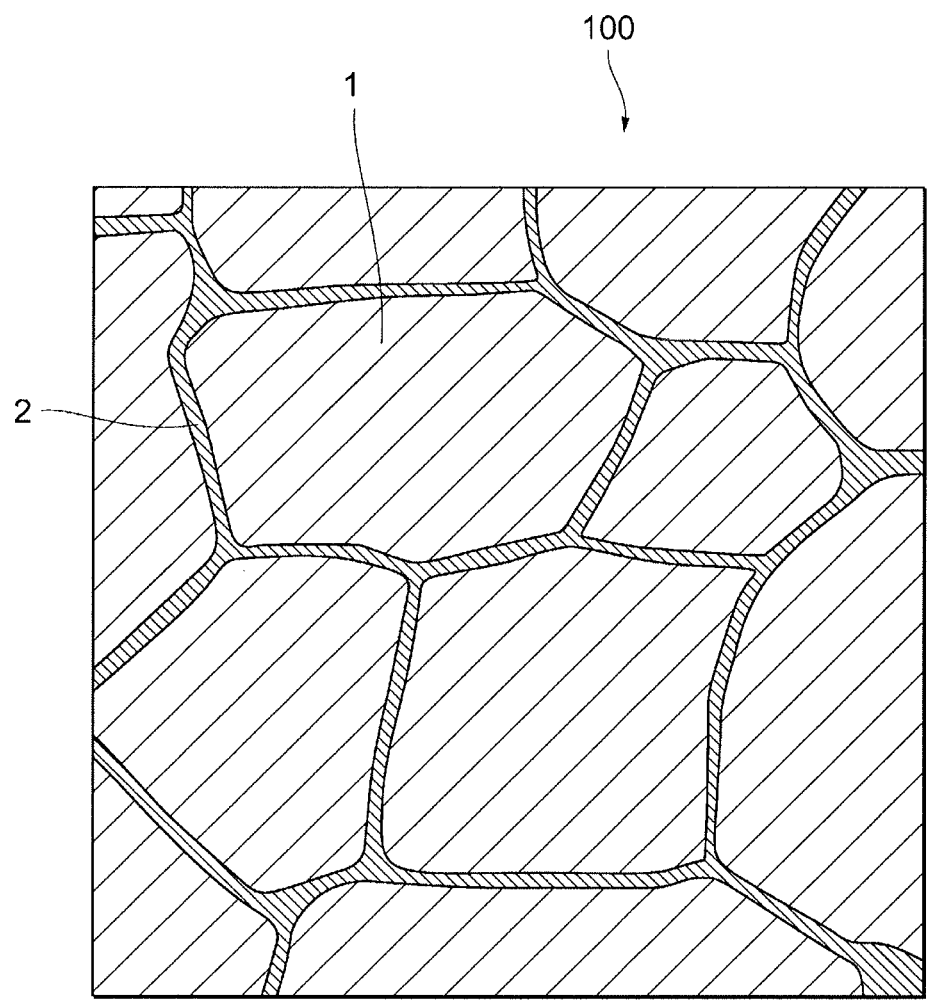
FIG. 1 is a cross-sectional view schematically representing the main phase crystal grains and the two-grain boundary parts of the R-T-B based sintered magnet according to the present invention.

FIG. 1 is a view schematically representing the cross-section structure of the R-T-B based sintered magnet of an embodiment according to the present invention. The R-T-B based sintered magnet according to this embodiment at least contains $R_2T_{14}B$ main phase crystal grains 1, and two-grain boundary parts 2 formed between adjacent $R_2T_{14}B$ main phase crystal grains 1.

The R-T-B based sintered magnet of the present embodiment is characterized in that the two-grain boundary parts formed by a phase containing R, Cu, Co, Ga, and Fe with the ratio of 40≤R≤70, 1≤Co≤10, 5≤Cu≤50, 1≤Ga≤15, and 1≤Fe≤40 (wherein, R+Cu+Co+Ga+Fe=100, and R is at least one selected from rare earth elements) exist. In addition, the thickness of the two-grain boundary parts formed by the above R—Co—Cu—Ga—Fe phase are preferably 5~500 nm. Most of the two-grain boundary parts contained in the R-T-B based sintered magnet of the present invention is composed of the R—Co—Cu—Ga—Fe phases. Further, the sintered magnet also can contain two-grain boundary parts formed by a phase comprising R, Cu, Ga and Fe without Co (Hereinafter, called as an R—Cu—Ga—Fe phase), an $R_6T_{13}Ga$ phase, an R phase or the other phase.

Figure 2:
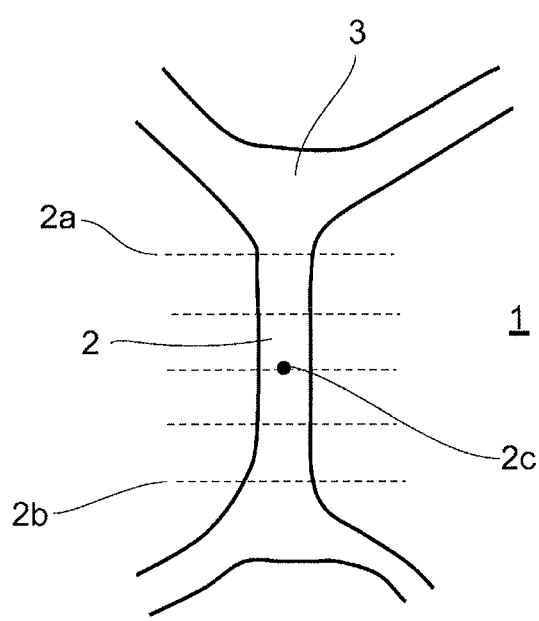
FIG. 2 is schematic drawing describing a composition analysis point of the two-grain boundary part and the method for measuring the width of the two-grain boundary parts.

FIG. 2 is schematic drawing describing the method for measuring the width and the composition of the two-grain boundary parts of the present embodiment. The two-grain boundary parts 2 and the grain boundary triple junctions 3 are formed between the adjacent $R_2T_{14}B$ main phase crystal grains. Focusing on one two-grain boundary part 2 as the measuring object, the boundaries 2a, 2b between this two-grain boundary part and the grain boundary triple junction 3 connecting thereto are determined. The vicinities of the boundaries 2a, 2b are not to be measured, and thus high accuracy is not a necessity. The interval between the boundaries 2a and 2b is quadrisected and three quadrisectors are drawn. The positions of the three quadrisectors are taken as points for determining the width of the two-grain boundary phases, yielding measured values of three points. Said determination is conducted to the 20 two-grain boundary parts arbitrarily selected to be focused on, and the thickness (width) of the total 60 measuring points is measured.

Moreover, in the 20 two-grain boundary parts, the composition analysis is conducted at the midpoint 2c on the line obtained by dividing boundaries 2a, 2b in half in the width direction of the two-grain boundary part. After composition analysis is carried out, phases are categorized and then accumulated. The compositions of the grain boundary phases exist in the two-grain boundary parts are categorized according to the composition features of each phase described as follows. Firstly, the composition feature of the R—Co—Cu—Ga—Fe phases is that the total content of R is 40~70 atomic %, Co is contained with the content of 1~10 atomic %, Cu is contained with the content of 5~50 atomic %, Ga is contained with the content of 1~15 atomic %, and Fe is contained with the content of 1~40 atomic %.

Beside the R—Co—Cu—Ga—Fe phases, R—Cu—Ga—Fe phases, $R_6T_{13}M$ phases and R phases may be contained in the two-grain boundary parts of the present embodiment. The R—Cu—Ga—Fe phase is characterized in that the total content of R is 10~20 atomic %, Co is contained with the content of lower than 0.5 atomic %, Cu is contained with the content of lower than 1 atomic %, Ga is contained with the content of 1~10 atomic %, and Fe is contained with the content of 65~90 atomic %. The $R_6T_{13}M$ phase is characterized in that the total content of R is 26~30 atomic %, Co is contained with the content of lower than 2 atomic %, Ga is contained with the content of 1~10 atomic %, balance amount of Fe is contained and the other elements are contained with the content of 60~70 atomic %. The R phase is characterized in that the total content of R is 90 atomic % or more.

Even if a phase contains the elements purposefully added in the R-T-B based sintered magnet or unavoidable impurities with a small amount such as less than several % beside the above constituent element, it also can be classified according to the features mentioned above. Despite this, the phase which is not corresponding to any one of the phases mentioned above can be treated as the other phase.

In the $R_2T_{14}B$ main phase crystal grains composing the R-T-B based sintered magnet according to this embodiment, as the rare earth R, it may be any one of a light rare-earth element, a heavy rare-earth element, or a combination of both, and Nd, Pr or the combination thereof is preferred from the viewpoint of material costs. As the iron group element T, Fe or the combination of Fe and Co is preferred, but is not limited thereto. In addition, B represents boron. In the R-T-B based sintered magnet of this embodiment, the contents of the elements relative to the total mass are shown as follows. In addition, mass % is regarded as the same unit with "weight %" in the present specification.
R: 25 to 35 mass %;
B: 0.5 to 1.5 mass %;
Ga: 0.03 to 1.5 mass %;
Cu: 0.01 to 1.5 mass %;
Co: 0.3 to 3.0 mass %;
Al: 0.03 to 0.6 mass %;
Fe: balance, substantially; and
The total content of elements other than Fe occupying the balance: 5 mass % or lower. Hereinafter, it is more preferable as follows.
R: 29.5 to 33.1 mass %;
B: 0.75 to 0.95 mass %;
Ga: 0.01 to 1.0 mass %;
Cu: 0.01 to 1.5 mass %;
Co: 0.3 to 3.0 mass %;
Al: 0.03 to 0.6 mass %;
Fe: balance, substantially; and
The total content of elements other than Fe occupying the balance: 5 mass % or lower.

If the content of each element falls within the above range, the R—Co—Cu—Ga—Fe phases are easily formed.

Hereinafter, more detailed description is provided on conditions such as contents of the elements or atomic ratios.

The content of R in the R-T-B based sintered magnet according to the present embodiment is 25 to 35 mass %. In the case that a heavy rare earth element is contained as R, the total content of rare earth elements including the heavy rare earth element is within said range. A heavy rare earth element refers to an element with a larger atom number among the rare earth elements, and generally, rare earth elements from 64Gd to 71Lu correspond to said heavy rare earth elements. If the content of R is within said range, it tends to get a high residual magnetic flux density and coercivity. If the content of R is lower than said range, it will be hard to form the $R_2T_{14}B$ phase as the main phase, and it is easy to form a α-Fe phase with soft magnetism, and consequently, the coercivity is decreased. In another aspect, if the content of R is larger than said range, the volume percentage of the $R_2T_{14}B$ phase becomes lower, and the residual magnetic flux density is reduced. In addition, in the sintering step of the production process, the sintering starting temperature extremely reduces, and the grain growth becomes easier. The more preferable range of the content of R is 29.5 to 33.1 mass %.

As R, either of Nd and Pr must be contained, and the ratio of Nd and Pr (calculated by a total of Nd and Pr) in R can be 80 to 100 atomic %, and it is more preferred to be 95 to 100 atomic %. If within such a range, a more favorable residual magnetic flux density and coercivity can be obtained. As set forth above, the R-T-B based sintered magnet may also contain Dy, Tb, Ho and the like heavy rare earth elements as R, and in this situation, the content of heavy rare earth elements (calculated as the total of heavy rare earth elements) in total mass of the R-T-B based sintered magnet is 1.0 mass % or less, more preferably 0.5 mass % or less, further preferably 0.1 mass % or less. If it is an R-T-B based sintered magnet of the present embodiment, even the contents of heavy rare earth elements are reduced like this, a favorable and high coercivity can still be obtained by rendering contents of other elements and the atomic ratios satisfying certain requirements.

The R-T-B based sintered magnet according to the present embodiment contains B. The content of B is 0.5 mass % or more and 1.5 mass % or less, preferably 0.7 mass % or more and 1.2 mass % or less, more preferably 0.75 mass % or more and 0.95 mass % or less. If the content of B is less than 0.5 mass %, the coercivity HcJ tends to reduce. Moreover, if the content of B is over 1.5 mass %, the residual magnetic flux density Br tends to decrease. Especially, when the content of B falls within the range of 0.75 mass % or more and 0.95 mass % or less, R—Co—Cu—Ga—Fe phases are easily formed.

The R-T-B based sintered magnet according to the present embodiment contains Co. The content of Co is preferably 0.3 mass % or more and 3.0 mass % or less. The added Co exists in any one of the main phase crystal grains, triple junctions and the two-grain boundary parts. It reads to the increase of the curie temperature and the improvement of the corrosion resistance of the grain boundary phases. Further, the demagnetization at high temperature can be inhibited by forming the two-grain boundary parts with the R—Co—Cu—Ga—Fe phases. Co can be added during preparing the alloys, and Co also can be diffused in the sintered body alone or together with Cu, Ga and the like through grain boundary diffusion mentioned below and thus Co can be contained.

The R-T-B based sintered magnet according to the present embodiment contains Cu. The addition amount of Cu is preferably 0.01 to 1.5 mass % in the whole magnet, more preferably 0.05 to 1.5 mass %. By making the addition amount within this range, Cu can be unevenly distributed in the triple junctions and the two-grain boundary parts. Cu which is unevenly distributed in the triple junctions and the two-grain boundary parts is helpful to form the R—Co—Cu—Ga—Fe phases, and thus demagnetization at high temperature can be inhibited. Cu can be added during preparing the alloys, and Cu also can be diffused in the sintered body alone or together with Co, Ga and the like through grain boundary diffusion mentioned below and thus Cu can be contained.

The R-T-B based sintered magnet according to the present embodiment further contains Ga. By containing Ga, the R—Co—Cu—Ga—Fe phases of the two-grain boundary parts can be easily formed. The content of Ga is preferably 0.01 to 1.5 mass %. If the content of Ga is less than this range, the suppression of demagnetization at high temperature becomes insufficient. Even if the content is more than the range, not only demagnetization at high temperature will not be further improved, but also saturation magnetization reduces, and thus the residual magnetic flux density is insufficient. In order to achieve a high suppression of demagnetization at high temperature and a high residual magnetic flux density, the content of Ga is further preferably 0.1 to 1.0 mass %. Ga can be added during preparing the alloys, and Ga also can be diffused in the sintered body alone or together with Co, Cu and the like through grain boundary diffusion mentioned below and thus Ga can be contained.

The R-T-B based sintered magnet according to the present embodiment further contains M together with Ga, and M is at least one element selected from the group consisting of Bi, Sn, Si and Ge. If at least one element selected from Bi, Sn, Si, and Ge is set as M, an R—Co—Cu—(Ga,M)-Fe phase can be easily formed by containing M. The R—Co—Cu—(Ga,M)-Fe phase can form the two-grain boundary part with the same thickness as that of the two-grain boundary parts formed by F—Co—Cu—Ga—Fe phase, and thus demagnetization at high temperature can be inhibited. The content of M is preferably 1.0 mass % or less. If the content of M is more than the range, not only demagnetization at high temperature will not be further improved, but also saturation magnetization reduces, and thus the residual magnetic flux density is insufficient. In order to achieve a high suppression of demagnetization at high temperature and a high residual magnetic flux density, M can be added during preparing the alloys, and M also can be diffused in the sintered body alone or together with Co, Cu and the like through grain boundary diffusion mentioned below and thus M can be contained.

The R-T-B based sintered magnet according to the present embodiment preferably contains Al. The obtained magnet can get a high coercivity, a high corrosion resistance, and an improved temperature performance by containing Al. The content of Al is preferably 0.03 mass % or more and 0.6 mass % or less, and more preferably 0.05 mass % or more and 0.25 mass % or less.

The R-T-B based sintered magnet according to the present embodiment contains Fe and the other elements beside the above mentioned elements. Fe and the other elements occupy the balance other than the total contents of the above elements in the total mass of the R-T-B based sintered magnet. However, in order to allow the R-T-B based sintered magnet functions sufficiently as a magnet, among the elements occupying the balance, the total content of elements other than Fe is preferably 5 mass % or less relative to the total mass of the R-T-B based sintered magnet.

In addition, the content of C in the R-T-B based sintered magnet according to the present embodiment is 0.05 to 0.3 mass %. If the content of C is lower than said range, the residual magnetic flux density will be insufficient. And, if larger than said range, the ratio of the magnetic field value (Hk) when the magnetization is 90% of residual magnetic flux density, with respect to coercivity, i.e. the squareness ratio (Hk/HcJ) becomes insufficient. In order to obtain the coercivity and the squareness ratio better, the content of C may also be 0.1 to 0.25 mass %.

In addition, the content of O in the R-T-B based sintered magnet according to the present embodiment is 0.05 to 0.25 mass %. If the content of O is lower than said range, the corrosion resistance of the R-T-B based sintered magnet will be insufficient. And, if it is larger than said range, a liquid phase cannot be sufficiently formed in the R-T-B based sintered magnet and the coercivity will decrease. In order to obtain the corrosion resistance and the coercivity better, the content of O is more preferably 0.05 to 0.20 mass %.

Additionally, in the R-T-B based sintered magnet according to the present embodiment, for example, Zr may be contained as the other element. In this situation, the content of Zr in total mass of the R-T-B based sintered magnet is preferably 0.01 to 1.5 mass %. Zr may inhibit the abnormal growth of crystal grains during the production of the R-T-B based sintered magnet, rendering the structure of the obtained sintered body (the R-T-B based sintered magnet) uniform and fine, which may improve the magnetic characteristic.

Moreover, the R-T-B based sintered magnet according to the present embodiment may contain 0.001 to 0.5 mass % of inevitable impurities like Mn, Ca, Ni, Cl, S, F and the like as the constituent elements other than above.

In addition, in the R-T-B based sintered magnet according to the present embodiment, the content of N is preferably 0.15 mass % or less. If the content of N is larger than said range, the coercivity tends to become insufficient.

An example of the method for producing the R-T-B based sintered magnet according to the present embodiment is described. The R-T-B based sintered magnet according to this embodiment may be produced by a conventional powder metallurgic method comprising a confecting process of confecting the raw material alloys, a pulverizing process of pulverizing the raw material alloys into fine powder raw materials, a pressing process of pressing the fine powder raw materials into a green compact, a sintering process of sintering the green compact into a sintered body, and a heat treating process of subjecting the sintered body to an aging treatment.

The confecting process is a process for confecting the raw material alloys that contain respective elements contained in the R-T-B based sintered magnet according to this embodiment. Firstly, the raw metals having the specified elements are prepared, and subjected to a strip casting method and the like. The raw material alloys are thus confected. As the metal raw materials, for examples, rare earth metals or rare earth alloys, pure iron, pure cobalt, ferroboron or alloys thereof can be exemplified. These metal raw materials are used to confect the raw material alloys of the R-T-B based sintered magnet having the desired composition. Alternatively, two kinds of alloys, i.e., the first alloy whose composition is close to $R_2T_{14}B$, and the second alloy mainly increasing R or the content of the additives, can be produced respectively, and then mixed before or after the fine pulverizing process. In addition, the alloy with R or the content of the additives increased whose composition is different from that of the second alloy is used as the third alloy, and the alloy with R or the content of the additives increased whose composition is different from those of the second alloy and the third alloy is used as the fourth alloy, and they are mixed with the first alloy before or after the fine pulverizing process. In order to promote the formation of the R—Co—Cu—Ga—Fe phases in the grain boundary, eutectic alloys, such as 80% Nd-20% Co, 70Nd-30% Cu, 80% Nd-20% Ga calculated with atomic %, are used as the second alloy, the third alloy, the fourth alloy, and mixed with the first alloy.

The pulverizing process is a process for pulverizing the raw material alloys obtained in the confecting process into fine powder raw materials. This process is preferably performed in two stages comprising a coarse pulverization and a fine pulverization, and may also be performed as one stage. The coarse pulverization may be performed by using, for example, a stamp mill, a jaw crusher, a braun mill, etc under an inert atmosphere. A hydrogen decrepitation in which pulverization is performed after hydrogen adsorption may also be performed. In the coarse pulverization, the raw material alloys are pulverized until the particle size is around several hundreds of micrometers to several millimeters.

The fine pulverization finely pulverizes the coarse powders obtained in the coarse pulverization, and prepares the fine powder raw materials with the average particle size of several micrometers. The average particle size of the fine powder raw materials may be set under the consideration of the growth of the crystal grains after sintering. For example, the fine pulverization may be performed by a jet mill.

The pressing process is a process for pressing the fine powder raw materials into a green compact in the magnetic field. Specifically, after the fine powder raw materials are filled into a press mold equipped in an electromagnet, the pressing is performed by orientating the crystallographic axis of the fine powder raw materials by applying a magnetic field via the electromagnet, while pressurizing the fine powder raw materials. The pressing may be performed in a magnetic field of 1000~1600 kA/m under a pressure of 30~300 MPa.

The sintering process is a process for sintering the green compact into a sintered body. After being pressed in the magnetic field, the green compact may be sintered in a vacuum or an inert atmosphere to obtain a sintered body. Preferably, the sintering conditions are suitably set depending on the conditions such as composition of the green compact, the pulverizing method of the fine powder raw materials, particle size, etc. For example, the sintering may be performed at 1000° C.~1100° C. for 1~12 hours. In addition, in the case of using the eutectic alloys, such as 80% Nd-20% Co, 70Nd-30% Cu, 80% Nd-20% Ga calculated with atomic %, as the second alloy, third alloy, and fourth alloy in the confecting process, the temperature during increasing the temperature in the sintering process is slowly increased to the temperature region of 500~700° C., in which the melting point of each eutectic alloy falls, in the way that liquid phases produced from each easily eutectic alloy react with each other, and thus the formation of the R—Co—Cu—Ga—Fe phases is promoted. Heating rate can be controlled with the consideration of the composition and the microstructure.

The heat treating process is a process for subjecting the sintered body to an aging treatment. After this process, the width of the two-grain boundary parts formed between the adjacent $R_2T_{14}B$ main phase crystal grains and the composition of the grain boundary phases formed in the two-grain boundary parts are determined. However, these microstructures are not controlled only in this process, but determined by considering both the conditions of the above sintering process and the situation of the fine powder raw materials. Hence, the temperature and time period for the heat treatment can be set under the consideration of the relationship between the conditions of the heat treatment and the microstructures of the sintered body. The heat treatment may be performed at a temperature of 500° C.~900° C., and may also be performed in two stages comprising a heat treatment in the vicinity of 800° C. followed by a heat treatment in the vicinity of 550° C. The width of the two-grain boundary part can be controlled by setting the composition of the alloys raw materials, the sintering condition and the heat treating condition respectively. An example of heat treating process is described as the method of controlling the width of the two-grain boundary parts. The width of the two-grain boundary parts may also be controlled according to the compositional factor as recited in Table 1.

In the present invention, each element, i.e., R, Co, Cu, Ga, Fe, used to form the R—Co—Cu—Ga—Fe phases is introduced in the sintered body through the grain boundary diffusion method after the sintered body is produced. By applying the grain boundary diffusion method, Co, Cu, and Ga can be distributed with a high concentration in the grain boundary containing the triple junctions and the two-grain boundary parts, which is considered to be helpful to form the R—Co—Cu—Ga—Fe phases. Specially, since the solid solution of Co is formed in the $R_2T_{14}B$ main phase grains, the grain boundary diffusion method is used in which the grain boundary is taken as a channel to make elements diffuse in the sintered body, and thus solid solution in the main phase is inhibited, and the concentration of Co, Cu and Ga in the grain boundary can be enhanced.

It is well known that the grain boundary diffusion method is the one in which the diffusion elements are prepared into vapor, or the powders of the solid diffusion materials are deposited onto the surface of the sintered body and then are subjected to a heat treatment. And any one of the methods mentioned above can be adopted in the present embodiment. In the case of adopting the method of using vapor, the concentration of the vapor needs to be properly adjusted, while in the case of using the powders of the diffusion materials, the deposited amount of the diffusion powders needs to be properly adjusted. Further, time period in the diffusion heat treatment can be adjusted by two methods. The condition of the heat treatment during diffusion is preferred to perform for about 1 to 24 hours at 550~1000° C. In this temperature range, the triple junction or the grain boundary phases of the two-grain boundary parts become liquid phase and then the liquid phase will ooze to the surface of the sintered body through the grain boundary. Thus, the diffusion elements can be provided into the sintered body through the oozed liquid phase.

R and Fe are rich in the sintered body, so only Co, Cu, and Ga can be subjected to the grain boundary diffusion. Co, Cu and Ga all have eutectic composition at the R-rich side, and thus their melting points are relatively low. The melted diffusion materials can effectively supply the diffusion elements to the liquid phases oozing from the sintered body. For example, the eutectic alloys of R—Co, R—Cu and R—Ga have low melting point, and they can be used as the diffusion materials. In this case, the mixed powders of R—Co, R—Cu and R—Ga can be used for diffusion. The heat treatment of the grain boundary diffusion can be performed to diffuse all essential elements at once, but it is preferable that the elements are diffused through different heat treatment according to the species of the element. The heat treatment during the introduction and after the introduction is very important for the formation of the two-grain boundary parts. As the same as mentioned above, the temperature and time period of the heat treatment can be set with the consideration of the relation between the conditions of the heat treatment and the microstructure of the sintered body.

The R-T-B based sintered magnet according to the present embodiment can be obtained via the above methods. However, the producing method for the R-T-B based sintered magnet is not limited to the above methods and can be suitably modified.

Next, the evaluation for the rate of demagnetization at high temperature of the R-T-B based sintered magnet according to this embodiment is described. The shape of the sample used for evaluation is not particularly limited. For example, in the present embodiment, a 10 mm×10 mm×4 mm of rectangular shaped R-T-B based sintered magnet can be used. The orientation direction of c axis of an $R_2T_{14}B$ crystal grain is the direction perpendicular to a wide plane of 10 mm×10 mm. Firstly, residual flux of the sample at a room temperature (25° C.) is measured after pulse magnetization with 5T, and then the value is taken as B0. The residual flux may be measured by for example a magnetic flux meter. Next, the sample is exposed to a high temperature of 130° C. for 2 hours, and back to the room temperature. Once the temperature of the sample returns to the room temperature, the residual flux is measured again and taken as B1. As such, the rate of demagnetization at high temperature D is evaluated by the formula below.

$$D=(B1-B0)/B0*100(\%)$$

In this embodiment, observation is performed with a scanning transmission electron microscope (STEM), the position of the midpoint $2c$ of the two-grain boundary part is determined as shown in FIG. 2, and then the thickness of the two-grain boundary part is measured. Further, the content ratios of the elements in the midpoint $2c$ of the two-grain boundary part are calculated as the composition of the grain boundary phase exist in the two-grain boundary part by performing point analysis with the energy dispersive X-ray spectroscopy (STEM-EDS) attached in STEM.

In the case that the obtained R-T-B based sintered magnet according to the present embodiment is used as a magnet for a rotary machine such as motor, the R-T-B based sintered magnet can be produced into a high reliable rotary machine with its output hardly reduced, such as motor, due that demagnetization at a high temperature hardly occur. The R-T-B based sintered magnet according to the present embodiment can be preferably used as a magnet of surface magnet type (Surface Permanent Magnet: SPM) motor wherein a magnet is attached on the surface of a rotor, an interior magnet embedded type (Interior Permanent Magnet: IPM) motor such as inner rotor type brushless motor, PRM (Permanent magnet Reluctance Motor) and the like. In concrete, the R-T-B based sintered magnet according to the present embodiment is preferably used for a spindle motor or a voice coil motor for a hard disk rotary drive of a hard disk drive, a motor for an electric vehicle or a hybrid car, an electric power steering motor for an automobile, a servo motor for a machine tool, a motor for vibrator of a cellular phone, a motor for a printer, a motor for a magnet generator and the like.

<A Motor>

Figure 3:
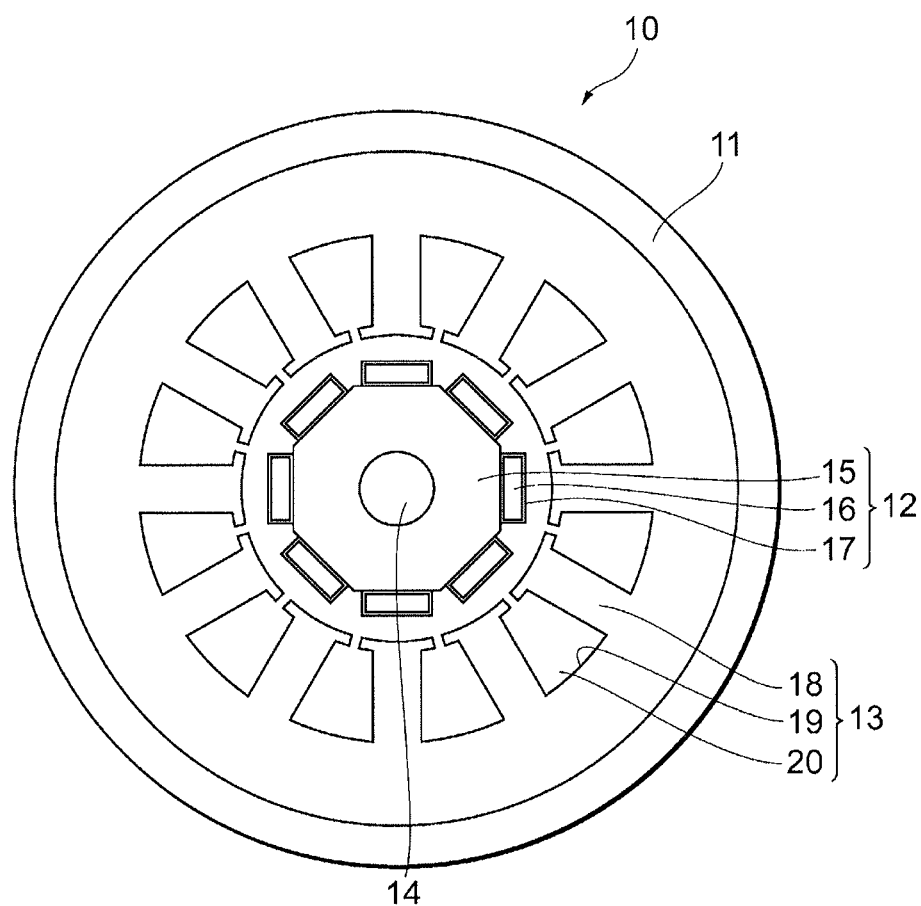
FIG. 3 is a cross-sectional view briefly showing the structure of a motor according to an embodiment.

Next, a preferable embodiment of the R-T-B based sintered magnet according to the present embodiment used as a motor will be described. Here, an example of the R-T-B based sintered magnet according to the present embodiment applied to SPM motor is described. FIG. 3 is a cross-sectional view briefly showing an embodiment of the structure of SPM motor. As shown in FIG. 3, SPM motor 10 comprises a columnar shaped rotor 12, a cylindrical shaped stator 13 and rotary shaft 14 in a housing 11. Rotary shaft 14 goes through a center of cross-section of rotor 12.

Rotor 12 comprises a columnar shaped rotor core (iron core) 15 of iron material and the like, a plural number of permanent magnets 16 arranged at a predetermined interval on outer peripheral surface of rotor core 15 and a plural number of magnet insert slots 17 containing the permanent magnet 16. The R-T-B based sintered magnet according to the present embodiment is used for the permanent magnet 16. A plural number of the permanent magnets 16 are set so as to arrange N-pole and S-pole alternately in each magnet insert slot 17 along a circumferential direction of the rotor 12. Thus, adjacent permanent magnets 16 generate magnetic field lines in mutually reversed directions along radial direction of rotor 12.

Stator 13 comprises a plural number of stator cores 18 and throttles 19, arranged at a predetermined interval along a circumferential direction of inner side of its cylindrical wall (peripheral wall) and along outer peripheral surface of rotor 12. Said plural number of stator cores 18 are arranged so as to be directed toward stator 13 and opposed to rotor 12. Further, coil 20 is wound around inside the each throttle 19. A permanent magnet 16 and stator core 18 are set so as to be opposed mutually.

Rotor 12, together with rotary shaft 14, is turnably installed in a space in stator 13. Stator 13 provides torque to rotor 12 by an electromagnetic action, and rotor 12 rotates along circumferential direction.

SPM motor 10 uses the R-T-B based sintered magnet according to the present embodiment as a permanent magnet 16. The permanent magnet 16 shows high magnetic characteristics and is hardly subjected to demagnetization at a high temperature. SPM motor 10 is thus capable of improving motor characteristics, such as a torque characteristic, and showing a high output for a long term; and that said SPM motor 10 is excellent in reliability.

Next, the present invention will be described in more detail based on specific examples. However, this invention is not limited to the following examples.

EXAMPLES

Preparation of Sintered Bodies

The sintered bodies used in Examples 1~7 and Comparative Examples 1~2 were produced by two alloys method. Firstly, raw material alloys were manufactured by a strip casting method to obtain an R-T-B based sintered magnet having a magnet composition I or a magnet composition II as shown in Table 1 and Table 2. As for raw material alloys, four kinds of alloys, i.e., the first alloys A and B mainly to form main phases of a magnet, the second alloys a and b mainly to form grain boundary parts, were prepared. In addition, in Table 1 and Table 2 (also applicable to Table 3), bal. referred to the remaining amount when the total composition was deemed as 100 mass % in each alloy, and (T.RE) represented the sum of the rare earth based elements (mass %).

TABLE 1

| | Composition (mass %) | | | | | | | | | Mass ratio |
|---|---|---|---|---|---|---|---|---|---|---|
| | Nd | Pr | (T.RE) | Co | Ga | Al | Cu | B | Fe | |
| Fist alloy A | 23.5 | 6.5 | 30.0 | 0.0 | 0.0 | 0.2 | 0.0 | 1.0 | bal. | 95 |
| Second alloy a | 39.0 | 11.0 | 50.0 | 0.0 | 0.0 | 0.2 | 0.0 | 0.0 | bal. | 5 |
| Magnet composition I | 24.3 | 6.7 | 31.0 | 0.0 | 0.0 | 0.2 | 0.0 | 0.9 | bal. | |

TABLE 2

| | Composition (mass %) | | | | | | | | | Mass ratio |
|---|---|---|---|---|---|---|---|---|---|---|
| | Nd | Pr | (T.RE) | Co | Ga | Al | Cu | B | Fe | |
| First alloy B | 23.5 | 6.5 | 30.0 | 0.0 | 0.0 | 0.2 | 0.0 | 1.0 | bal. | 95 |
| Second alloy b | 39.0 | 11.0 | 50.0 | 10.0 | 8.0 | 0.2 | 14.0 | 0.0 | bal. | 5 |
| Magnet composition II | 24.3 | 6.7 | 31.0 | 0.50 | 0.4 | 0.2 | 0.7 | 0.9 | bal. | |

Next, after hydrogen was stored to each of the alloys at room temperature, a hydrogen storage pulverization (coarse pulverization) for desorbing hydrogen was performed in Ar atmosphere at 600° C. for 1 hour.

In addition, in the present example, each step, from the hydrogen storage pulverization to the sintering process, (the fine pulverization and pressing process) was done in an Ar atmosphere with the oxygen concentration therein being lower than 50 ppm (same conditions were applied in the following examples and comparative examples).

Next, for each alloy, after the hydrogen storage pulverization and before the fine pulverization, 0.1 mass % of zinc stearate was added to the coarsely pulverized powder as a pulverization aid. Then, the mixture was mixed by a Nauta mixer. And then, a jet mill was used to perform the fine pulverization so as to provide a fine powder raw material having an average particle size of around 4.0 μm.

Subsequently, the obtained fine powder raw material of the first alloy and that of the second alloy were mixed in a mass ratio of 95:5 by using the Nauta mixer so that a mixed powder of the starting powder of the R-T-B based sintered magnet was prepared.

The obtained mixed powder was filled in a press mold arranged in an electromagnet, and the powder was pressed under an applied pressure of 120 MPa in a magnetic field of 1200 kA/m. In this way, the green compact was obtained.

Next, the green compact was sintered under vacuum at 1060° C. for 4 hours and then rapidly cooled to provide a sintered body (the R-T-B based sintered magnet) having the composition I or II as shown in Table 1. Next, machining was conducted by using a vertical processing machine to provide a rectangular solid with a shape of 10.1 mm×10.1 mm×4.2 mm. The orientation direction of c axis of the $R_2T_{14}B$ crystal grain was the direction of 4.2 mm thickness.

(Preparation of Powders of Diffusion Materials)

The diffusion materials were produced in order to introduce the elements i.e., Co, Cu, and Ga, into the sintered body by a grain boundary diffusion method using a powder of the diffusion materials. The metals were weighted with a ratio of being the composition of the diffusion materials 1~4 as shown in Table 3, and then melt and casted by an arc melting furnace. This operation was repeated three times to prepare an alloy. The obtained alloy was melt by high frequency induction heating, and then the molten metal was rapidly cooled by a roll to produce a quenched ribbon. The obtained quenched ribbon was coarsely pulverized, and then was put into a well-closed container together with a stainless pulverization medium in the Ar atmosphere with an oxygen concentration of 50 ppm or less to produce into a powder with an average particle size of 10~20 μm. In addition, the obtained powder of the diffusion materials was got in the glove box, and then subjected to a slow oxidation treatment with a safe operation in the air. A binder resin was added into the thus obtained powder of the diffusion materials to produce a coating of the diffusion materials with an alcohol as the solvent. As for the mixing ratio, in the case of taking the mass of the powder of diffusion materials as 100, the amount of the fine powder of the butyral used as the binder resin was 2, and the amount of the alcohol was 100. The mixture was added into a resin cylinder-typed container having a lid. The container was closed, and then put on the stand of a ball mill. The mixture was subject to rotation in a rate of 120 rpm to produce into a coating.

TABLE 3

| | Composition ratio (atomic %) | | | | Amount of the coating |
|---|---|---|---|---|---|
| | Nd | Co | Cu | Ga | wt %/time |
| Diffusion material 1 | 80.0 | 20.0 | 0.0 | 0.0 | 5.5 |
| Diffusion material 2 | 70.0 | 0.0 | 30.0 | 0.0 | 4.5 |
| Diffusion material 3 | 80.0 | 0.0 | 0.0 | 20.0 | 3.8 |
| Diffusion material 4 | 80.0 | 6.7 | 8.7 | 4.5 | 5.5 |

Comparative Example 1

The machined article of the sintered body with the magnet composition II was subjected to an aging treatment at 900° C. for 18 hours and then at 540° C. for 2 hours (both in Ar atmosphere), and taken as Comparative Example 1.

Comparative Example 2

The machined article of the sintered body with the magnet composition I (with a shape of 10.1 mm×10.1 mm×4.2 mm) was coated by the diffusion material 4 of Table 3, wherein two wide surfaces of 10.1 mm×10.1 mm of the machined article were evenly coated with using 5.5 wt % of diffusion material in total. Then, a diffusion heat treatment was performed at 900° C. for 6 hours in the Ar atmosphere. The residual diffusion material on the coated surface was removed with sandpaper. Again, the machined article was coated by the same amount of diffusion material 4, a diffusion heat treatment was performed at 900° C. for 6 hours in the Ar atmosphere, and then the residual diffusion material on the coated surface was removed in the same way. Further, the machined article was coated by the same amount of diffusion material 4, and then a diffusion heat treatment was performed at 900° C. for 6 hours. In short, the steps of coating the machined article with 5.5 wt % of diffusion material 4 and performing the heat treatment at 900° C. for 6 hours in the Ar atmosphere were repeated three times. Subsequently, the aging treatment was performed at 540° C. for 2 hours in the Ar atmosphere. The residual diffusion material on the coated surface was removed with sandpaper, and thus an R-T-B based sintered magnet was obtained.

Example 1

The machined article of the sintered body with the magnet composition I (with a shape of 10.1 mm×10.1 mm×4.2 mm) was coated by the diffusion materials 3 of Table 3, wherein two wide surfaces of 10.1 mm×10.1 mm of the machined article were evenly coated with 3.8 wt % of the diffusion material in total. Then, a diffusion heat treatment was performed at 900° C. for 6 hours in the Ar atmosphere. After the heat treatment, the residual diffusion material on the coated surface was removed with sandpaper. Next, the two surfaces of the machined article were coated with 4.5 wt % of the diffusion material 2, and the heat treatment was performed at 900° C. for 6 hours in the Ar atmosphere in the same way. After the heat treatment, the residual diffusion material on the coated surface was removed with sandpaper. Further, the two surfaces of the machined article were coated with 5.5 wt % of the diffusion material 1, and the heat treatment was performed at 900° C. for 6 hours in the Ar atmosphere in the same way. Then, the aging treatment was carried out at 540° C. for 2 hours in the Ar atmosphere. The residual diffusion material on the coated surface was removed with sandpaper to obtain the R-T-B based sintered magnet.

Example 2

The machined article of the sintered body with the magnet composition I (with a shape of 10.1 mm×10.1 mm×4.2 mm) was coated by the diffusion materials 3 of Table 3, wherein two wide surfaces of 10.1 mm×10.1 mm of the machined article were evenly coated with 3.8 wt % of the diffusion material in total. Then, a diffusion heat treatment was performed at 800° C. for 10 hours in the Ar atmosphere. After the heat treatment, the residual diffusion material on the coated was removed with sandpaper. Next, the two surfaces of the machined article were coated with 4.5 wt % of the diffusion material 2, and the heat treatment was performed at 800° C. for 10 hours in the Ar atmosphere in the same way. After the heat treatment, the residual diffusion material on the coated surface was removed with sandpaper. Further, the two surfaces of the machined article were coated with 5.5 wt % of the diffusion material 1, and then the heat treatment was performed at 800° C. for 10 hours in the Ar atmosphere in the same way. Then, the aging treatment was carried out at 540° C. for 2 hours in the Ar atmosphere. The residual diffusion material on the coated surface was removed with sandpaper to obtain the R-T-B based sintered magnet.

Example 3

The machined article of the sintered body with the magnet composition I (with a shape of 10.1 mm×10.1 mm×4.2 mm) was coated by the diffusion materials 1 of Table 3, wherein two wide surfaces of 10.1 mm×10.1 mm of the machined article were evenly coated with 5.5 wt % of the diffusion material in total. Then, a diffusion heat treatment was performed at 900° C. for 6 hours in the Ar atmosphere. After the heat treatment, the residual diffusion material on the coated surface was removed with sandpaper. Next, the two surfaces of the machined article were coated with 4.5 wt % of the diffusion material 2, and the heat treatment was performed at 900° C. for 6 hours in the Ar atmosphere in the same way. After the heat treatment, the residual diffusion material on the coated surface was removed with sandpaper. Further, the two surfaces of the machined article were coated with 3.8 wt % of the diffusion material 3, and then the heat treatment was performed at 900° C. for 10 hours in the Ar atmosphere in the same way. Next, the aging treatment was carried out at 540° C. for 2 hours in the Ar atmosphere. The residual diffusion material on the coated surface was removed with sandpaper to obtain the R-T-B based sintered magnet.

In the obtained comparative examples and examples, coating the diffusion material, heat treatment and the surface machining with the sandpaper was repeated, so in order to ensure smoothness and parallelism of the surfaces, grinding was performed in Comparative Examples 1 to 2 and Examples 1 to 3, and all the R-T-B based sintered magnets in Comparative Examples 1 to 2 and Examples 1 to 3 were produced into a rectangular solid with a shape of 10.0 mm×10.0 mm×4.0 mm.

The results of the composition analysis by means of X-ray fluorescence analysis and ICP were shown in Table 4. It could be confirmed that all the samples had almost the same composition and the amounts of Co, Cu, and Ga were increased, but the increased amount of Nd was little although it occupies seven or more out of ten in the composition of the each diffusion materials based on the atomic ratio. The reason was considered that the concentration of Nd in the grain boundary comprising the grain boundary triple junction and the two-grain boundary part contained in the sintered body was high, and thus the sufficient concentration gradient could not be achieved to diffuse into the sintered body. That is, it could be known that the properties were not improved by increasing the amount of R in the present invention.

TABLE 4

| | Magnet compo- sition | Species of diffusion material | | | Diffusion time (hr) | | | Diffusion temper- ature (° C.) | Composition (mass %) (T. | | | | | | | | | | | |
|---|---|---|---|---|---|---|---|---|---|---|---|---|---|---|---|---|---|---|---|---|
| | | First | Second | Third | First | Second | Third | | Nd | Pr | RE) | Co | Cu | Ga | Si | Sn | Ge | Bi | Al | B | Fe |
| Comparative Example 1 | II | 去 | | | 去 | | | 去 | 24.3 | 6.7 | 31.0 | 0.5 | 0.7 | 0.4 | 0.0 | 0.0 | 0.0 | 0.0 | 0.2 | 0.9 | bal. |

TABLE 4-continued

| Magnet compo-sition | Species of diffusion material | | | Diffusion time (hr) | | | Diffusion temperature (° C.) | Composition (mass %) | | | | | | | | | | | |
|---|---|---|---|---|---|---|---|---|---|---|---|---|---|---|---|---|---|---|---|
| | First | Second | Third | First | Second | Third | | Nd | Pr | (T. RE) | Co | Cu | Ga | Si | Sn | Ge | Bi | Al | B | Fe |
| Comparative Example 2 | I | 4 | 4 | 4 | 6 | 6 | 6 | 900 | 24.3 | 6.7 | 31.0 | 0.5 | 0.7 | 0.4 | 0.0 | 0.0 | 0.0 | 0.0 | 0.2 | 0.9 | bal. |
| Example 1 | I | 3 | 2 | 1 | 6 | 6 | 6 | 900 | 24.7 | 6.7 | 31.4 | 0.5 | 0.7 | 0.4 | 0.0 | 0.0 | 0.0 | 0.0 | 0.2 | 0.9 | bal. |
| Example 2 | I | 3 | 2 | 1 | 10 | 10 | 10 | 800 | 24.8 | 6.7 | 31.5 | 0.5 | 0.7 | 0.4 | 0.0 | 0.0 | 0.0 | 0.0 | 0.2 | 0.9 | bal. |
| Example 3 | I | 1 | 2 | 3 | 6 | 6 | 6 | 900 | 24.7 | 6.7 | 31.4 | 0.5 | 0.7 | 0.4 | 0.0 | 0.0 | 0.0 | 0.0 | 0.2 | 0.9 | bal. |

The composition analysis at the point 2c on the grain boundary of each sample was measured and the thickness of the two-grain boundary part was measured by the means of TEM-EDS with the same method as mentioned above. The results obtained by classifying the grain boundary phase exist in the two-grain boundary part according to the values of composition analysis were shown in Table 5, together with the results of the residual magnetic flux density Br, the coercivity Hcj and demagnetization rate at a high temperature. In Comparative Examples 1 and 2, the number (A) of the R—Co—Cu—Ga—Fe phase was 0, while it was confirmed in Examples 1, 2 and 3 that the R—Co—Cu—Ga—Fe phase existed. The less A is, the more number (B) of the R—Cu—Ga—Fe phase tended. As for the number (C) of the $R_6T_{13}Ga$ phase and the number (D) of the R phase, no significant difference was found in Comparative Examples and Examples. The Hcj and the demagnetization rate at a high temperature were highly improved in Examples 1, 2 and 3.

On the other hand, regardless of whether the samples are comparative examples or examples, the decrease of Br tends to be suppressed as the number (B) of the R—Cu—Ga—Fe increases. It could be seen that by getting a balance between the number (A) of the R—Co—Cu—Ga—Fe phase and the number (B) of the R—Cu—Ga—Fe phase, the R-T-B based sintered magnet which could produce a high magnetic flux and was hardly subjected to demagnetization at high temperature could be produced.

The measurement results of the thickness of the two-grain boundary part were shown in Table 6. The two-grain boundary part with a thickness of 5~500 nm could be formed by the R—Co—Cu—Ga—Fe phase. The thick two-grain boundary part could be formed by $R_6T_{13}Ga$ phases or R phases, but it could be seen from Table 5 that the number was low. Thus, it could be thought of that the formation of two-grain boundary parts by R—Co—Cu—Ga—Fe phases made a contribution to the improvement of demagnetization rate at a high temperature.

TABLE 5

| | Formation number of two-grain boundary parts in each phase | | | | Magnetization rate | | |
|---|---|---|---|---|---|---|---|
| | R—Co—Cu—Ga—Fe A | R—Cu—Ga—Fe B | $R_6T_{13}Ga$ C | R D | Br mT | Hcj kA/m | at high temperature % |
| Comparative Example 1 | 0 | 11 | 5 | 4 | 1380 | 1329 | −18.0 |
| Comparative Example 2 | 0 | 10 | 4 | 6 | 1378 | 1334 | −16.8 |
| Example 1 | 12 | 2 | 4 | 2 | 1370 | 1672 | −0.2 |
| Example 2 | 13 | 0 | 3 | 4 | 1345 | 1675 | −0.1 |
| Example 3 | 4 | 10 | 2 | 2 | 1375 | 1520 | −5.5 |

TABLE 6

| | | R—Co—Cu—Ga—Fe nm | R—Cu—Ga—Fe nm | R6T13Ga nm | R nm |
|---|---|---|---|---|---|
| Comparative Example 1 | Average | — | 7 | 180 | 22 |
| | Maximum | — | 15 | 250 | 31 |
| | Minimum | — | 4 | 110 | 12 |
| Comparative Example 2 | Average | — | 8 | 212 | 41 |
| | Maximum | — | 12 | 370 | 125 |
| | Minimum | — | 3 | 30 | 8 |
| Example 1 | Average | 225 | 9 | 143 | 155 |
| | Maximum | 498 | 12 | 200 | 235 |
| | Minimum | 25 | 6 | 66 | 120 |
| Example 2 | Average | 215 | 6 | 187 | 146 |
| | Maximum | 320 | 8 | 253 | 203 |
| | Minimum | 22 | 5 | 12 | 11 |
| Example 3 | Average | 111 | 9 | 271 | 99 |
| | Maximum | 155 | 10 | 300 | 187 |
| | Minimum | 40 | 7 | 55 | 34 |

The compositions of the R—Co—Cu—Ga—Fe phase confirmed in Example 1 were shown in Table 7. The content of Fe was all 35.7 atomic % or less, and it was very low. It could be considered that magnetization significantly reduced compared to that of the well-known grain boundary phase in the prior art. Moreover, that the concentration of Cu was very high was also a feature.

TABLE 7

| Analysis point | Composition of R—Co—Cu—Ga—Fe phase (atomic %) | | | | | |
|---|---|---|---|---|---|---|
| | Pr | Nd | Cu | Ga | Fe | Co |
| 1 | 15.3 | 46.0 | 15.3 | 8.5 | 7.2 | 7.7 |
| 2 | 17.6 | 48.7 | 21.0 | 3.3 | 2.7 | 6.7 |
| 3 | 9.4 | 32.8 | 47.3 | 5.5 | 2.5 | 2.5 |
| 4 | 17.3 | 49.3 | 17.8 | 3.8 | 4.9 | 7.0 |
| 5 | 15.0 | 43.6 | 15.9 | 2.6 | 18.1 | 4.9 |
| 6 | 13.7 | 39.7 | 13.5 | 2.4 | 24.8 | 5.9 |
| 7 | 9.3 | 36.8 | 40.7 | 5.5 | 4.8 | 2.9 |
| 8 | 12.8 | 32.2 | 12.5 | 2.5 | 35.6 | 4.4 |
| 9 | 17.3 | 47.5 | 7.8 | 2.1 | 22.1 | 3.2 |
| 10 | 16.8 | 47.5 | 19.8 | 3.6 | 7.2 | 5.1 |
| 11 | 18.8 | 38.4 | 12.6 | 11.3 | 10.9 | 8.0 |
| 12 | 9.6 | 34.7 | 39.2 | 5.1 | 8.7 | 2.7 |

The demagnetization rate at a high temperature was attempted to improve by the steps different from those in Examples 4~7. The raw material alloys were prepared to produce the sintered body having the magnet composition III to VI in Table 8 to 11. The compositions of Examples 4, 5, 6, and 7 were magnet compositions III, IV, V, VI, respectively. Each the first alloy of Tables 8 to 11 was produced by the strip casting method. On the other hand, the compositions of the second, third and fourth alloys were the same as those of diffusion materials 1, 2 and 3. The quenched ribbon was produced by rapidly cooling by the similar manufacturing method of diffusion materials, and then pulverized into 40 μm. After 0.1 wt % of zinc stearate was added without a slow oxidation treatment, a jet mill was used to perform the fine pulverization so as to provide a fine powder raw material having an average particle size of 4.0 μm. Subsequently, the fine powder raw materials of the first to fourth alloys were produced into a mixed powder with a ratio as shown in the table by using the Nauta mixer. The obtained mixed powder was filled in a press mold arranged in an electromagnet, and the powder was pressed under an applied pressure of 120 MPa in a magnetic field of 1200 kA/m. In this way, the green compact was obtained. The green compact was sintered under vacuum. At this time, the temperature range of 500~900° C. in the heating part of the sintering temperature pattern was raised in a rate of 0.5° C./min, the temperature range except the above was raised in a rate of 10° C./min until the temperature reached at 1060° C. The temperature was kept at 1060° C. for 4 hours to perform the sintering step, and then the sintered body was rapidly cooled, subjected to an aging treatment at 900° C. for 18 hours and then at 540° C. for 2 hours (both in Ar atmosphere). The obtained R-T-B based sintered magnet was machined to produce into a rectangular solid with a shape of 10.0 mm×10.0 mm×4.0 mm. The orientation direction of c axis in the $R_2T_{14}B$ crystal grain was the thickness one of 4.0 mm.

TABLE 8

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass raito |
| First alloy | 21.46 | 5.94 | 0.00 | 27.40 | 1.40 | 0.00 | 0.03 | 0.00 | 1.60 | 1.01 | bal. | 94 |
| Second alloy | 90.73 | 0.00 | 0.00 | 90.73 | 9.27 | 0.00 | 0.00 | 0.00 | 0.00 | 0.00 | 0.00 | 2 |
| Third alloy | 84.12 | 0.00 | 0.00 | 84.12 | 0.00 | 0.0 | 0.00 | 15.88 | 0.00 | 0.00 | 0.00 | 2 |
| Fourth alloy | 89.22 | 0.00 | 0.00 | 89.22 | 0.00 | 10.78 | 0.00 | 0.00 | 0.00 | 0.00 | 0.00 | 2 |
| Magnet composition III | 25.46 | 5.58 | 0.00 | 31.04 | 1.50 | 0.22 | 0.03 | 0.32 | 1.50 | 0.95 | bal. | |

TABLE 9

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 21.15 | 5.85 | 0.00 | 27.00 | 3.13 | 0.63 | 0.11 | 0.95 | 0.00 | 0.83 | bal. | 90 |
| Second alloy | 90.73 | 0.00 | 0.00 | 90.73 | 9.27 | 0.00 | 0.00 | 0.00 | 0.00 | 0.00 | 0.00 | 2 |
| Third alloy | 84.12 | 0.00 | 0.00 | 84.12 | 0.00 | 0.0 | 0.00 | 15.88 | 0.00 | 0.00 | 0.00 | 4 |
| Fourth alloy | 89.22 | 0.00 | 0.00 | 89.22 | 0.00 | 10.78 | 0.00 | 0.00 | 0.00 | 0.00 | 0.00 | 4 |
| Magnet composition IV | 27.78 | 5.26 | 0.00 | 33.05 | 3.00 | 1.00 | 0.10 | 1.49 | 0.00 | 0.75 | bal. | |

TABLE 10

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 20.99 | 5.81 | 0.20 | 27.00 | 0.00 | 0.00 | 0.63 | 0.00 | 0.11 | 0.97 | bal. | 95 |
| Second alloy | 90.73 | 0.00 | 0.00 | 90.73 | 9.27 | 0.00 | 0.00 | 0.00 | 0.00 | 0.00 | 0.00 | 3 |
| Third alloy | 84.12 | 0.00 | 0.00 | 84.12 | 0.00 | 0.0 | 0.00 | 15.88 | 0.00 | 0.00 | 0.00 | 1 |
| Fourth alloy | 89.22 | 0.00 | 0.00 | 89.22 | 0.00 | 10.78 | 0.00 | 0.00 | 0.00 | 0.00 | 0.00 | 1 |
| Magnet composition V | 24.40 | 5.52 | 0.19 | 30.11 | 0.28 | 0.11 | 0.64 | 0.16 | 0.10 | 0.92 | bal. | |

TABLE 11

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 21.31 | 5.89 | 0.00 | 27.20 | 0.70 | 0.50 | 0.25 | 0.00 | 0.42 | 0.91 | bal. | 92 |
| Second alloy | 90.73 | 0.00 | 0.00 | 90.73 | 9.27 | 0.00 | 0.00 | 0.00 | 0.00 | 0.00 | 0.00 | 4 |
| Third alloy | 84.12 | 0.00 | 0.00 | 84.12 | 0.00 | 0.0 | 0.00 | 15.88 | 0.00 | 0.00 | 0.00 | 2 |
| Fourth alloy | 89.22 | 0.00 | 0.00 | 89.22 | 0.00 | 10.78 | 0.00 | 0.00 | 0.00 | 0.00 | 0.00 | 2 |
| Magnet composition VI | 26.70 | 5.42 | 0.00 | 32.12 | 1.01 | 0.68 | 0.23 | 0.32 | 0.39 | 0.84 | bal. | |

In Comparative Examples 3 to 6, the sintered bodies with the same magnet compositions III~VI as those in Examples 4 to 7 were prepared. The first and the second alloys produced by the strip casting method were used as the raw material alloy of these comparative examples. The compositions in Comparative Examples 3, 4, 5, and 6 were respectively magnet compositions III, IV, V, and VI in this order. The alloy composition used to produce each sintered body with the magnet composition of Comparative Examples 3 to 6 was shown in Tables 12~15. The production process in Comparative Examples 3 to 6 was the same as that in Comparative Example 1. The obtained R-T-B based sintered magnet was subjected to grinding to provide a rectangular solid with a shape of 10.0 mm×10.0 mm×4.0 mm. The orientation direction of c axis in the $R_2T_{14}B$ crystal grain was the thickness one of 4.0 mm.

TABLE 12

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 24.74 | 5.30 | 0.00 | 30.04 | 0.00 | 0.00 | 0.03 | 0.00 | 1.58 | 1.00 | bal. | 95 |
| Second alloy | 39.00 | 11.00 | 0.00 | 50.00 | 30.03 | 4.31 | 0.00 | 6.35 | 0.00 | 0.00 | bal. | 5 |
| Magnet composition III | 25.46 | 5.58 | 0.00 | 31.04 | 1.50 | 0.22 | 0.03 | 0.32 | 1.50 | 0.95 | bal. | |

TABLE 13

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 27.19 | 4.96 | 0.00 | 31.17 | 1.50 | 0.00 | 0.11 | 0.00 | 0.00 | 0.83 | bal. | 90 |
| Second alloy | 39.00 | 11.00 | 0.00 | 50.00 | 16.50 | 10.00 | 0.00 | 14.90 | 0.00 | 0.00 | bal. | 10 |
| Magnet composition IV | 27.78 | 5.26 | 0.00 | 33.05 | 3.00 | 1.00 | 0.10 | 1.49 | 0.00 | 0.75 | bal. | |

TABLE 14

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 23.63 | 5.23 | 0.20 | 29.06 | 0.00 | 0.00 | 0.63 | 0.00 | 0.11 | 0.97 | bal. | 95 |
| Second alloy | 39.00 | 11.00 | 0.00 | 50.00 | 5.56 | 2.16 | 0.00 | 3.18 | 0.00 | 0.00 | bal. | 5 |
| Magnet composition V | 24.40 | 5.52 | 0.19 | 30.11 | 0.28 | 0.11 | 0.60 | 0.16 | 0.10 | 0.92 | bal. | |

TABLE 15

| | Composition (mass %) | | | | | | | | | | | |
|---|---|---|---|---|---|---|---|---|---|---|---|---|
| | Nd | Pr | Dy | (T. RE) | Co | Ga | Al | Cu | Zr | B | Fe | Mass ratio |
| First alloy | 26.05 | 5.13 | 0.00 | 31.18 | 0.00 | 0.00 | 0.24 | 0.00 | 0.41 | 0.88 | bal. | 95 |
| Second alloy | 39.00 | 11.00 | 0.00 | 50.00 | 20.30 | 13.51 | 0.00 | 6.35 | 0.00 | 0.00 | bal. | 5 |
| Magnet composition VI | 26.70 | 5.42 | 0.00 | 32.12 | 1.01 | 0.68 | 0.23 | 0.32 | 0.39 | 0.84 | bal. | |

As for Examples 4~7 and Comparative Examples 3~6, the composition at the point $2c$ in the two-grain boundary part of each sample was analyzed and the thickness of the two-grain boundary part was measured by the means of TEM-EDS. The results obtained by classifying the grain boundary phase exist in the two-grain boundary part according to the values of composition analysis were shown in Table 16, together with the results of the residual magnetic flux density Br, the coercivity Hcj and demagnetization rate at a high temperature. In each comparative example, no R—Co—Cu—Ga—Fe phase had been found while the R—Co—Cu—Ga—Fe phase was formed in each example. In the examples and comparative examples, if compared among the ones with the same magnet composition, demagnetization rate at a high temperature was improved in examples. The formation process of R—Co—Cu—Ga—Fe phase was not clear. It could be considered that since the second alloy had a liquid phase forming temperature of 625° C., the third alloy had a liquid phase forming temperature of 520° C., and the fourth alloy had a liquid phase forming temperature of 651° C., liquid phases of the second, third and fourth alloys easily reacted with each other as raising temperature to the range of 500~900° C. with a rate of 0.5° C./min, which could help to form R—Co—Cu—Ga—Fe phases.

TABLE 16

|  | Magnet composition | Formation number of two-grain boundary part in each phase | | | | | Br mT | Hcj kA/m | Demagnetization rate at high temperature % |
|---|---|---|---|---|---|---|---|---|---|
|  |  | R—Co—Cu—Ga—Fe A | R—Cu—Ga—Fe B | $R_6T_{13}Ga$ C | R D | Other E |  |  |  |
| Example 4 | III | 10 | 2 | 3 | 5 | 0 | 1326 | 1479 | −8.0 |
| Example 5 | IV | 9 | 1 | 5 | 5 | 0 | 1286 | 1750 | −2.1 |
| Example 6 | V | 6 | 10 | 2 | 2 | 0 | 1408 | 1271 | −19.1 |
| Example 7 | VI | 11 | 3 | 2 | 4 | 0 | 1347 | 1739 | −1.9 |
| Comparative Example 3 | III | 0 | 4 | 12 | 4 | 0 | 1336 | 1318 | −17.2 |
| Comparative Example 4 | IV | 0 | 1 | 13 | 6 | 0 | 1317 | 1437 | −10.0 |
| Comparative Example 5 | V | 0 | 5 | 10 | 5 | 0 | 1410 | 1190 | −24.6 |
| Comparative Example 6 | VI | 0 | 2 | 11 | 7 | 0 | 1360 | 1585 | −3.5 |

The measurement results of the thickness of the two-grain boundary part were shown in Table 17. Like Examples 1~3, it could be confirmed that the two-grain boundary parts formed by R—Co—Cu—Ga—Fe phases were thick as 8~444 nm.

TABLE 17

|  |  | R—Co—Cu—Ga—Fe nm | R—Cu—Ga—Fe nm | $R_6T_{13}Ga$ nm | R nm |
|---|---|---|---|---|---|
| Example 4 | Average | 230 | 9 | 223 | 20 |
|  | Maximum | 444 | 12 | 404 | 31 |
|  | Minimum | 27 | 6 | 30 | 12 |
| Example 5 | Average | 144 | 7 | 247 | 51 |
|  | Maximum | 270 | 10 | 436 | 125 |
|  | Minimum | 22 | 6 | 46 | 8 |
| Example 6 | Average | 122 | 7 | 182 | 178 |
|  | Maximum | 208 | 8 | 284 | 235 |
|  | Minimum | 36 | 6 | 79 | 120 |
| Example 7 | Average | 115 | 7 | 118 | 200 |
|  | Maximum | 225 | 6 | 194 | 288 |
|  | Minimum | 8 | 7 | 42 | 116 |
| Comparative Example 3 | Average | — | 11 | 132 | 171 |
|  | Maximum | — | 13 | 222 | 199 |
|  | Minimum | — | 6 | 48 | 153 |
| Comparative Example 4 | Average | — | 9 | 231 | 133 |
|  | Maximum | — | 13 | 373 | 254 |
|  | Minimum | — | 6 | 80 | 24 |
| Comparative Example 5 | Average | — | 9 | 181 | 111 |
|  | Maximum | — | 10 | 274 | 191 |
|  | Minimum | — | 7 | 82 | 28 |
| Comparative Example 6 | Average | — | 7 | 189 | 124 |
|  | Maximum | — | 7 | 349 | 203 |
|  | Minimum | — | 6 | 92 | 31 |

In addition, the compositions of R—Co—Cu—Ga—Fe phase confirmed in Examples 4~7 at three points per one sample were shown in Table 18. The content of Fe had been confirmed to be very low and it was 27.4 atomic % or less, while the concentration of Cu had been found out to be very high. Thus, the same results as those in Table 7 were obtained.

TABLE 18

| | Analysis point | Composition of R—Co—Cu—Ga—Fe phase (atomic %) | | | | | | |
|---|---|---|---|---|---|---|---|---|
| | | Pr | Nd | Dy | Cu | Ga | Fe | Co |
| Example 4 | 1 | 14.2 | 33.2 | 0.0 | 35.0 | 9.3 | 6.0 | 2.3 |
| | 2 | 16.0 | 41.2 | 0.0 | 22.3 | 2.9 | 10.1 | 7.5 |
| | 3 | 12.3 | 31.6 | 0.0 | 17.7 | 8.5 | 20.6 | 9.3 |
| Example 5 | 1 | 9.7 | 39.0 | 0.0 | 21.4 | 8.6 | 11.5 | 9.8 |
| | 2 | 14.3 | 45.1 | 0.0 | 24.7 | 3.3 | 7.8 | 4.8 |
| | 3 | 14.8 | 34.4 | 0.0 | 11.4 | 9.3 | 23.8 | 6.3 |
| Example 6 | 1 | 9.0 | 26.9 | 0.0 | 29.8 | 9.6 | 16.5 | 8.3 |
| | 2 | 12.3 | 31.6 | 0.0 | 12.6 | 10.5 | 27.4 | 5.6 |
| | 3 | 10.0 | 31.7 | 0.0 | 34.7 | 3.5 | 15.2 | 4.9 |
| Example 7 | 1 | 13.8 | 41.3 | 0.0 | 8.7 | 4.3 | 23.6 | 8.4 |
| | 2 | 10.7 | 35.4 | 0.4 | 31.2 | 1.1 | 13.3 | 8.0 |
| | 3 | 11.4 | 27.8 | 0.0 | 46.9 | 1.7 | 9.7 | 2.5 |

It could be known from the above that the coercivity and the demagnetization rate at high temperature had been improved in the R-T-B based sintered magnets of examples. Compared to comparative examples, it could be confirmed that there was a great difference in the two-grain boundary parts. It was confirmed that there was R—Co—Cu—Ga—Fe phase in the two-grain boundary part of examples, which was not observed in comparative examples. This phase had a composition where the content of Fe was very low while the concentration of Cu was high. Also, the formation of the two-grain boundary part with a thickness of 5~500 nm was confirmed.

Hereinabove, the present invention is described based on the embodiments. The embodiments are illustrative, which can be subjected to various variation and modification within the scope of the claims of this invention as for those skilled in the art. Thus, the description of the present specification and the drawings should be deemed as illustrative but not limiting.

According to the present invention, an R-T-B based sintered magnet that may be used even at a high temperature environment can be provided.

DESCRIPTION OF REFERENCE NUMERALS 1 main phase crystal grains
2 two-grain boundary part
2a, 2b boundary
2c the midpoint of the two-grain boundary phase
3 a triple junction
100 an R-T-B based sintered magnet
10 a SPM motor
11 a casing
12 a rotor
13 a stator
14 a rotating axis
15 a rotor core (iron core)
16 a permanent magnet
17 a magnet inserting slot
18 a stator core
19 a throttle
20 a coil

What is claimed is:

1. An R-T-B based sintered magnet comprising $R_2T_{14}B$ crystal grains and two-grain boundary parts between the $R_2T_{14}B$ crystal grains,
   wherein the two-grain boundary parts are formed at least by:
   (i) a phase containing R, Cu, Co, Ga and Fe with an atomic ratio of $40 \leq R \leq 70$, $1 \leq Co \leq 10$, $5 \leq Cu \leq 50$, $1 \leq Ga \leq 15$, and $1 \leq Fe \leq 40$ exist, $R+Cu+Co+Ga+Fe=100$, R is at least one selected from rare earth elements, T is Fe and optionally one or more other elements of iron group, and
   (ii) a phase containing R, Cu, Ga, Fe and optionally Co with an atomic ratio of $10 \leq R \leq 20$, $0 \leq Co < 0.5$, $0 < Cu < 1$, and $1 \leq Ga \leq 10$ exist, $R+Cu+Co+Ga+Fe=100$, and
   the contents of the elements relative to the total mass in the R-T-B based sintered magnet are shown as follows:
   R: 29.5 to 33.1 mass %;
   B: 0.75 to 0.95 mass %;
   Ga: 0.01 to 1.0 mass %;
   Cu: 0.01 to 1.5 mass %;
   Co: 0.3 to 3.0 mass %;
   Al: 0.03 to 0.6 mass %;
   Fe: balance, substantially;
   the total content of elements other than Fe occupying the balance: 5 mass % or lower,
   the ratio of Nd and Pr in R is 95 to 100 atomic %, and
   the content of heavy rare earth elements in total mass of the R-T-B based sintered magnet is 1.0 mass % or less.

2. The R-T-B based sintered magnet according to claim 1, wherein the average thickness of the two-grain boundary parts formed by said phase is 5~500 nm.

3. A motor comprising the R-T-B based sintered magnet according to claim 1.

4. A motor comprising the R-T-B based sintered magnet according to claim 2.

* * * * *